July 17, 1956   L. C. BEARER   2,755,320
MEANS AND METHOD FOR CONVERTING HYDROCARBONS
Filed Oct. 23, 1951
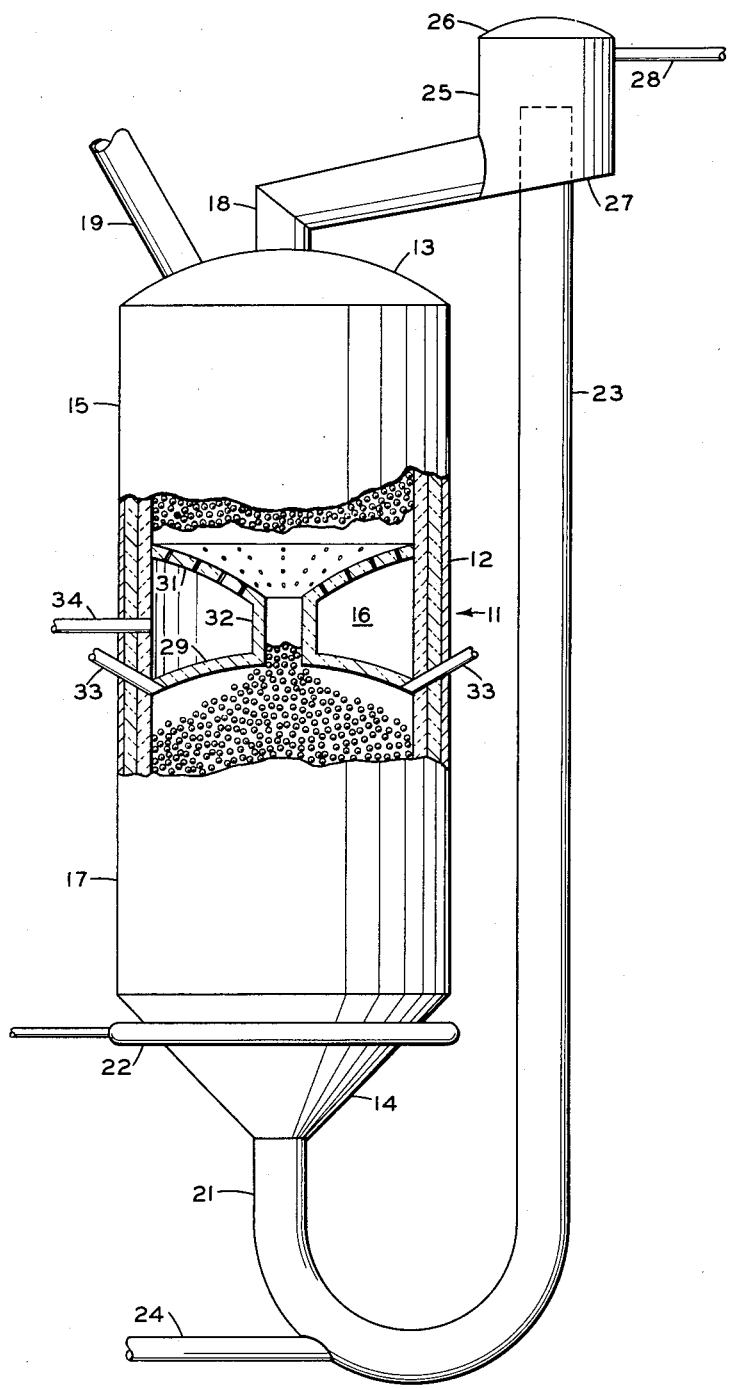
INVENTOR.
L. C. BEARER
BY Hudson and Young
ATTORNEYS

United States Patent Office 2,755,320
Patented July 17, 1956

2,755,320

MEANS AND METHOD FOR CONVERTING HYDROCARBONS

Louis C. Bearer, Bartlesville, Okla., assignor to Phillips Petroleum Company, a corporation of Delaware Application October 23, 1951, Serial No. 252,614

6 Claims. (Cl. 260—679)

This invention relates to pebble heater apparatus. In one of its more specific aspects, it relates to a single shell pebble heater apparatus. In another of its more specific aspects, it relates to improved reactor zones for the conversion of hydrocarbons. In another of its more specific aspects, it relates to the conversion of hydrocarbons in pebble heater apparatus.

Apparatus of the so-called "pebble heater" type has been utilized in recent years for the purpose of heating fluids to elevated temperatures. Such apparatus is especially suited for use in temperature ranges above those at which the best available high temperature structural alloys fail. Thus, such equipment may be used for superheating steam or other gases and for the pyrolysis of hydrocarbons to produce valuable products such as ethylene and acetylene, as well as for other reactions and purposes. Conventional pebble heater-type apparatus includes two refractory-lined contacting chambers disposed one above the other and connected by a refractory-lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, and are then conevyed to the top of the uppermost chamber to complete the cycle.

Solid heat exchange material which is conventionally used in pebble heater apparatus is generally called "pebbles." The term "pebbles" as used herein denotes any solid refractory material of flowable size and form, having strength, which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to about 1 inch in diameter. In a high temperature process, pebbles having a diameter of between about ¼ to ⅜ inch are preferred. The pebbles must be formed of a refractory material which will withstand temperatures at least as high as the highest temperature attained in the pebble heating chamber. The pebbles must also be capable of withstanding temperature changes within the apparatus. Refractory materials, such as metal alloys, ceramics, or other satisfactory material may be utilized to form such pebbles. Silicon carbide, alumina, periclase, beryllia, Stellite, zirconia, and mullite may be satisfactorily used to form such pebbles or may be used in admixture with each other or with other materials. Pebbles formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to temperatures generally in the range of 1400° F. to 3200° F. The hot pebbles are thereafter contacted with the fluid to be superheated or reacted, as the case may be, in the other chamber. Generally, pebble inlet temperatures in the second chamber are about 100° F. to 200° F. below the highest temperature of the pebbles within the first chamber. In processes for the production of ethylene from light hydrocarbons, such as ethane or propane, the pebble temperature in the reaction chamber is usually in the range of 1200° F. to 1800° F. For the production of acetylene by pyrolysis of hydrocarbons, temperatures in the range of 1800° F. to 3000° F. are desirable.

In the past considerable trouble has been encountered in the operation of pebble heater apparatus when converting hydrocarbons, particularly when those hydrocarbons are heavy residual oils. One of the outstanding difficulties which has been encountered during the operation of pebble heater apparatus in the conversion of hydrocarbons is the lay-down of carbon on the roof of the reactor chamber. Many times the carbon lay-down has been so great as to materially obstruct gas flow in the upper portion of the reactor chamber. An even more serious problem has been encountered by reason of the fact that large aggregates of the carbon or coke break loose from the surface of the reactor dome and gravitate through the chamber and eventually lodge in the pebble outlet from the reactor chamber or in the elevator system for the pebble heater device. When coke lodges in the pebble outlet conduit or in the elevator, flow of pebbles through the pebble heater system is considerably reduced and is finally brought to a standstill. At times the coke lodges in the chamber and results in very uneven pebble flow and non-uniform cracking. It is then necessary to take the pebble heater system off stream to remove the coke material from the reactor dome and from the conduits in which the stoppage has occurred. I have devised a method whereby the problem of carbon lay-down on the reactor dome is substantially overcome.

It is believed that the carbon is deposited on the surface of the reactor dome by reason of the deposition and accumulation of condensed liquid material. Such deposition and accumulation occurs for the reason that the reactor dome of conventional chambers is at a temperature considerably lower than that of the temperature of the reactor gaseous effluent. Once the droplets of liquid condense on the reactor dome they are subjected to radiant heat within the upper portion of the reactor and are converted to coke. Thus, there is a constant build-up of coke on the reactor dome, which build-up, oftentimes is so great as to interrupt the normal pattern of pebble flow within the reactor. By my invention the dome of the reaction zone is maintained at such a temperature that heat is constantly passed through that dome to the gaseous effluent. By this method, the condensation of droplets of hydrocarbon material on the reactor dome is substantially obviated.

By at least one aspect of this invention, at least one of the following objects of the invention is attained. An object of this invention is to provide improved pebble heater apparatus for converting hydrocarbons. Another object of the invention is to provide an improved reactor zone in pebble heater apparatus. Another object of the invention is to provide an improved method for reacting hydrocarbons in pebble heater apparatus. Another object of the invention is to provide a means for maintaining the reactor dome of pebble heater apparatus at a temperature materially above that of the gaseous effluent from the reactor zone. Other and further objects and advantages will be apparent to those skilled in the art upon study of the accompanying discussion and the drawings.

Broadly speaking, this invention comprises a single chamber pebble heater apparatus which is divided into three zones by an annular combustion zone intermediate the ends of the single chamber. The roof of the reactor zone is formed as an imperforate refractory dome which may be constructed in a manner similar to that described in connection with the load-supporting dome in L. J. Weber's U. S. Patent 2,534,089. Alternately, the dome may be cast in place, intermediate the ends of the single pebble chamber. A combustion zone, or a plurality thereof is formed above the dome by means of pebble throats or a throat and a perforate refractory floor is supported on the throat or throats and thus on the refractory reactor zone dome. Thus, if a single pebble throat is utilized, an annular combustion chamber is formed between the reactor zone dome and the perforate floor member thereabove. Heat from the combustion zone travels through the uninsulated reactor zone dome so as to constantly maintain that member at a temperature higher than that of the gaseous effluent removed from the upper portion of the reactor zone.

Better understanding of this invention will be obtained upon reference to the drawing which is a sectional elevation of the improved pebble heater apparatus of this invention.

Referring particularly to the device shown in the drawing, pebble heater apparatus 11 comprises a shell 12 which is closed at its upper and lower ends by closure members 13 and 14, respectively. The chamber formed within the shell 12 is divided into three zones, i. e., a pebble heating zone 15, a combuston zone 16, and a reactor zone 17. Pebble inlet conduit means 18 and gaseous effluent conduit means 19, are provided in the upper end portion of zone 15 preferably in closure member 13. Pebble outlet conduit 21 and reactant material inlet conduit means 22 are provided in the lower end of zone 17, preferably in closure member 14. Conduit 21 may form a portion of elevator 23, if the elevator utilized is a gas-lift type. A pebble flow control, not shown, is provided intermediate the ends of conduit 21. This flow control may be of any conventional type, such as a gate valve, a star valve, a table feeder, or the like. The elevator may be a mechanical type, such as a bucket type, a screw-conveyor type, or the like. In the gas-lift type elevator, as shown in the drawing, lift-gas inlet conduit 24 is provided in the lower portion of conduit 21 downstream of the flow controller. The upper end of conduit 23 extends into a separator chamber 25. Chamber 25 is closed at its upper and lower ends by closure members 26 and 27, closure member 27 sloping downwardly toward conduit 18 in the upper end portion of zone 15. The upper end of conduit 18 is connected to the lower end portion of chamber 25. Gaseous effluent conduit 28 extends from a point intermediate the ends of chamber 25.

Provided intermediate the ends of shell 12 are closure members 29 and 31. As pointed out above, closure member 29 is imperforate and may be formed as a load-supporting arch which forms the floor of combustion zone 16. Closure member 31 is perforate over its entire area and may be supported upon closure member 29 by means of throat member 32. In another modification of this invention, however, closure member 31 may be a load-supporting arch such as is described in L. J. Weber's U. S. Patent 2,534,089, and throat 32 may be formed like the pebble throat through the combustion chamber of the Weber pebble heater. In this modification, closure member 29 supports only the load of the refractory material making up the pebble throat and its own weight. Closure member 29 is uninsulated so as to facilitate the passage of heat therethrough from the combustion zone to the reaction zone. Gaseous effluent conduits 33 extend from the upper end portion of zone 17, preferably through a portion of closure member 29 so as to obtain heat from the combustion zone and thus obviate the deposition of carbon at the effluent conduit inlets. Heating material inlet conduit 34 extends into combustion zone 16, preferably being disposed tangentially thereto, but the direction of introduction of heating material into the combustion zone should not unduly limit this invention for any direction and any number of points of introduction may be utilized.

In the operation of the pebble heater of this invention, pebbles are introduced into the upper portion of zone 15 through inlet conduit 18 and form a contiguous gravitating gas-pervious mass within that zone. This mass of pebbles continues as a contiguous bed downwardly through the constricted zone formed within the pebble conduit 32 and through reactor zone 17. Heating material is introduced into combustion zone 16 through conduit 34 and is in one aspect of the invention burned therein, the heat of combustion raising the resulting combustion gases to a temperature above that required for the conversion of hydrocarbons in the reactor zone. Resulting reaction products are distributed within combustion zone 16 and passed through the perforations in closure member 31 into the lower portion of the gravitating pebble mass within pebble heater zone 15. The heating gas passes upwardly through the gravitating pebble bed in zone 15 in direct heat exchange with and countercurrent to the flow of those pebbles. Gaseous effluent is removed from the upper portion of zone 15 through conduit 19. The pebbles heated in this manner are gravitated through conduit 32 into zone 17.

Although the description of this invention heretofore has been specifically described in connection with the introduction of fuel into zone 16 and the burning of that fuel in that zone, it is contemplated that hot gaseous material heated at some exterior source may be utilized for the heating of pebbles within zone 15. In such operation, the hot gases are introduced into zone 16 through conduit 34 and are distributed in that chamber to the many openings through closure member 31 into heating zone 15. The openings through closure member 31 are such size as to permit the flow of gaseous materials therethrough but prevent the flow of pebbles therethrough.

Hydrocarbon reactant materials are introduced into the lower portion of reaction zone 17 through inlet conduit 22, and those gaseous or vaporous materials flow upwardly through the gravitating mass of hot pebbles within zone 17, in direct heat exchange with and counter-current to the flow of those pebbles. The hydrocarbon materials are raised to reaction temperature in direct heat exchange with the hot pebbles within zone 17 and resulting reaction products escape from the pebble mass within zone 17 and pass into the void space between pebble mass and heated reactor zone dome 29.

Dome 29 is maintained at such a temperature that it tends to repel the gaseous material from its lower surface, thus, in part, preventing accumulation and conversion of hydrocarbon materials to coke on its lower surface. The reaction products are rapidly removed as gaseous effluent from the upper portion of zone 17 through effluent conduit 33 and are immediately quenched to a temperature such that further reaction thereof will not occur. Pebbles which gravitate from the lower end of reactor zone 17 through conduit 21 are entrained in a stream of lift gas 24 which moves the pebbles as a fluidized mass into separator chamber 25 wherein the lift-gas is separated from the pebbles, the pebbles gravitating to the floor of chamber 25 and thus into the pebble inlet conduit 18. The lift-gas is removed from separator 25 through effluent conduit 28.

Various modifications of this invention will be apparent to those skilled in the art upon study of the accompanying disclosure. Such modifications are clearly within the spirit and the scope of this invention.

I claim:

1. Pebble heater apparatus comprising in combination a single closed, upright, elongated shell; pebble inlet means in the upper end of said shell; gaseous effluent conduit means in the upper end portion of said shell;

reactant material inlet means in the lower end portion of said shell; pebble outlet conduit means in the bottom of said shell; an elevator connected at its lower end to said pebble outlet conduit means and at its upper end to said pebble inlet conduit means; a single, imperforate, heat conductive closure member devoid of insulation transversely positioned within said shell, intermediate its ends; a perforate closure member transversely positioned within said shell and spaced above said imperforate closure member, forming a gas distribution zone therebetween; pebble conduit means extending through a central portion of said perforate closure member, said gas distribution zone and said imperforate closure member; heating material inlet means extending into said gas distribution zone; and gaseous effluent conduit means extending from the chamber formed below said imperforate closure member.

2. Pebble heater apparatus comprising in combination a single closed, upright, elongated shell; pebble inlet means in the upper end of said shell; gaseous effluent conduit means in the upper end portion of said shell; reactant material inlet means in the lower portion of said shell; pebble outlet conduit means in the bottom of said shell; a separator chamber connected at its lower end portion to said pebble inlet conduit; gaseous effluent conduit means extending from said separator chamber; a gas-lift conduit connected at its lower end to said pebble outlet conduit means and extending into said separator chamber; lift-gas inlet conduit means in the lower end portion of said gas-lift conduit; a single, imperforate, heat conductive closure member devoid of insulation transversely positioned within said shell, intermediate its ends; a perforate closure member transversely positioned within said shell and spaced above said imperforate closure member, forming a gas distribution zone therebetween; pebble conduit means extending through a central portion of said perforate closure member, said gas distribution zone and said imperforate closure member; heating material inlet means extending into said gas distribution zone; and gaseous effluent conduit means extending from the chamber formed below said imperforate closure member.

3. Pebble heater apparatus comprising in combination a single closed, upright, elongated shell; pebble inlet conduit means in the upper end of said shell; gaseous effluent conduit means in the upper end portion of said shell; reactant material inlet means in the lower portion of said shell; pebble outlet conduit means in the bottom of said shell; an elevator connected at its lower end to said pebble outlet conduit means and at its upper end to said pebble inlet conduit means; a single imperforate, heat conductive, load-supporting closure member devoid of insulation transversely positioned within and supported at its periphery by said shell, intermediate its ends; at least one pebble conduit extending upwardly through said imperforate closure member a spaced distance thereabove, and supported upon said imperforate closure member; a perforate closure member transversely positioned within said shell, extending from the wall of said shell and supported upon said pebble conduit, forming a gas distribution zone between said perforate and imperforate closure members; heating material inlet means extending into said gas distribution zone; and gaseous effluent conduit means extending from the chamber formed below said imperforate closure member.

4. Pebble heater apparatus comprising in combination a single closed, upright, elongated shell; pebble inlet conduit means in the upper end of said shell; gaseous effluent conduit means in the upper end portion of said shell; reactant material inlet means in the lower portion of said shell; pebble outlet conduit means in the bottom of said shell; an elevator connected at its lower end to said pebble outlet conduit means and at its upper end to said pebble inlet conduit means; a single imperforate, heat conductive, load-supporting closure member devoid of insulation transversely positioned within and supported at its periphery by said shell, intermediate its ends; a perforate load-supporting closure member transversely positioned within and supported at its periphery by said shell and spaced above said imperforate closure, forming a gas distribution zone therebetween; pebble conduit means extending through said imperforate closure member, said gas distibution zone and said perforate closure member and supported by said imperforate closure member; heating material inlet means extending into said gas distribution zone, and gaseous effluent conduit means extending from the chamber formed below said imperforate closure member.

5. The pebble heater apparatus of claim 1 wherein said gaseous effluent conduit means extending from the chmaber formed below said imperforate closure member extends through a portion of that closure member to the exterior of said shell.

6. A process for converting hydrocarbons which comprises in combination the steps of introducing pebbles into the upper portion of a pebble heating zone; gravitating said pebbles downwardly as a contiguous gravitating mass through said pebble heating zone, a communication zone, and a reaction zone; introducing heating material into a gas distribution zone intermediate said pebble heating zone and said reaction zone; passing hot gaseous heat exchange material from said gas distribution zone upwardly through said contiguous mass of pebbles within said pebble heating zone, whereby said pebbles are heated to a temperature above the temperature desired within said reaction zone; removing gaseous effluent material from the upper portion of said pebble heating zone; passing hydrocarbon reactant material into the lower portion of said reaction zone and upwardly in direct heat exchange with the hot pebbles within said reaction zone, whereby said reactant materials are elevated to reaction temperatures; removing gaseous effluent material from the upper end portion of said reaction zone; transferring heat from said gas distribution zone through the lower portion of said gas distribution zone into the upper portion of said reaction zone so as to repel fluid materials from the upper end of said reaction zone; removing pebbles from the lower portion of said reaction zone; and elevating said pebbles to the upper end portion of said pebble heating zone.

References Cited in the file of this patent

UNITED STATES PATENTS

| | | |
|---|---|---|
| 2,165,587 | Sweeney | July 11, 1939 |
| 2,398,759 | Angell | Apr. 23, 1946 |
| 2,432,298 | Eastwood et al. | Dec. 9, 1947 |
| 2,492,999 | Lassiat | Jan. 3, 1950 |
| 2,518,842 | Weber | Aug. 15, 1950 |
| 2,536,436 | Goins | Jan. 2, 1951 |
| 2,561,771 | Ardern | July 24, 1951 |
| 2,589,984 | Borcherding | Mar. 18, 1952 |